(12) United States Patent
Nomiyama et al.

(10) Patent No.: US 7,496,581 B2
(45) Date of Patent: Feb. 24, 2009

(54) INFORMATION SEARCH SYSTEM, INFORMATION SEARCH METHOD, HTML DOCUMENT STRUCTURE ANALYZING METHOD, AND PROGRAM PRODUCT

(75) Inventors: Hiroshi Nomiyama, Kawasaki (JP); Toshitaka Iwao, Yokhama (JP)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 10/621,474

(22) Filed: Jul. 17, 2003

(65) Prior Publication Data
US 2004/0054654 A1 Mar. 18, 2004

(30) Foreign Application Priority Data
Jul. 19, 2002 (JP) ............................. 2002-211634

(51) Int. Cl.
*G06F 7/00* (2006.01)
(52) U.S. Cl. ...................................................... 707/100
(58) Field of Classification Search ............... 707/1–10, 707/100–103
See application file for complete search history.

(56) References Cited

U.S. PATENT DOCUMENTS

| | | | | |
|---|---|---|---|---|
| 5,848,407 | A * | 12/1998 | Ishikawa et al. | 707/2 |
| 6,163,779 | A * | 12/2000 | Mantha et al. | 707/100 |
| 6,271,840 | B1 * | 8/2001 | Finseth et al. | 715/513 |
| 6,704,722 | B2 * | 3/2004 | Wang Baldonado | 707/3 |
| 7,047,033 | B2 * | 5/2006 | Wyler | 455/552.1 |
| 2003/0046276 | A1 * | 3/2003 | Gutierrez et al. | 707/3 |

* cited by examiner

*Primary Examiner*—Wilson Lee
(74) *Attorney, Agent, or Firm*—Martin J. McKinley; Law Office of Jim Boice

(57) ABSTRACT

In an information search using a computer, a flexible information search based on a variety of strategies that depend on a purpose of use of information is effectively realized. An information search system comprises a document structure analyzing section for analyzing a structure of an HTML document taking into account a meaning in a prescribed web page, a significance calculating section for calculating the degrees of significance of other web sites linking from the web page, based on a result of the analysis and according to predetermined strategies, and a crawling executing section for crawling the web sites depending on the degrees of significance calculated by the significance calculating section.

7 Claims, 15 Drawing Sheets

FIG. 5A

```
<img src="bullet.gif">ITEM 1<br>
<img src="bullet.gif">ITEM 2<br>
```

FIG. 5B

```
<a href="top.htm">GO TO TOP</a>

<a href="top.htm">GO TO TOP</a>
```

FIG. 6

```
<img src="bullet.gif">
<a href="news1.htm">The Latest News of Developer Works</a>
New contents in this week are added to respective zones of
Web service, Java technology, Linux, Open source, and XML.
<img src="bullet.gif">
<a href="news2.htm">Internet King of Translation Bilingual Version 5
Linux version, delivery (download sale) is started</a>
"Internet Translation King of Bilingual version 5" with
"Intelligent Translation Engine" realizing proper and precise
translation depending on the context.
```

FIG. 7

```
<img src="bullet.gif">
<a href="news1.htm">The Latest News of Developer Works</a>
New contents in this week are added to respective zones of
Web services, Java Technology, Linux, Open source, and XML.
for details, click <a href="detail.htm">have </a>
<img src="bullet.gif">
<a href="news2.htm">Internet Translation King of Bilingual Version 5
Linux version, delivery (download sale) is started</a>
"Internet Translation King of Bilingual Version 5" with
"Intelligent Translation Engine" realizing proper and precise
translation depending on the context.
```

FIG. 8

```
<b>IBM-RELATED LINKS(US)</b>
<a href="http://www.ibm.com">HOME</a><br>
<a href="http://www.ibm.com/products/us">PRODUCTS & SERVICES</a><br>
<a href="http://www.ibm.com/support">SUPPORT & DOWNLOADS</a><br>

<b>IBM JAPAN-RELATED LINKS</b>
<a href="http://www.ibm.com/jp">HOME</a><br>
<a href="http://www.ibm.com/products/jp">PRODUCTS & SERVISES</a><br>
<a href="http://www.ibm.com/jp/support">SUPPORT & DOWNLOADS</a><br>
```

FIG. 9

```
<block>
<block title="IBM-RELATED LINKS(US)">
<object type="anchor" url="http://www.ibm.com" title="HOME"/>
<object type="anchor" url="http://www.ibm.com/products/us" title="PRODUCTS & SERVICES"/>
<object type="anchor" url="http://www.ibm.com/support" title="SUPPORT & DOWNLOADS"/>
</block>
<block title="IBM JAPAN-RELATED LINKS">
<object type="anchor" url="http://www.ibm.com/jp" title="HOME"/>
<object type="anchor" url="http://www.ibm.com/products/jp" title="PRODUCTS & SERVICES"/>
<object type="anchor" url="http://www.ibm.com/jp/support" title="SUPPORT & DOWNLOADS"/>
</block>
</block>
```

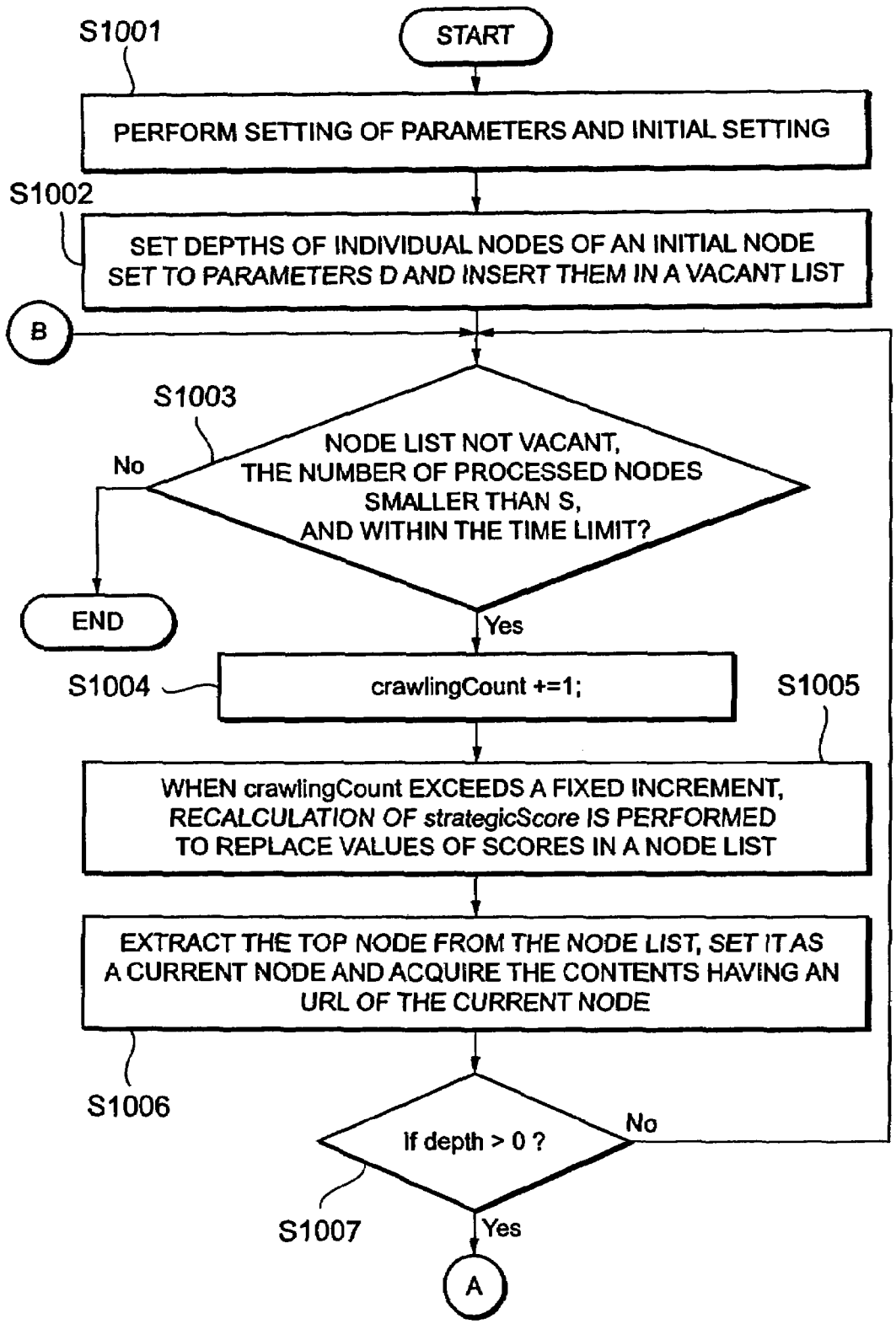

FIG. 12

This summer, Lotus and Tivoli Systems Japan will be unified with IBM Japan [Site 1]
+IBM Japan will unify Lotus etc. in July [Site2]
+IBM Japan will unify Lotus and Tivoli [Site3]
+Lotus and Tivoli will be unified with IBM Japan [Site4]

Block Starts [TD] TYPE=SITE_MAP

| [ANCHOR] [TITLE]Personalization<br>http://www.ibm.com/cgi-bin/ipc/prefs/jp<br>[DNODEID]15<br>[RIMAGE]http://www.ibm.com/i/prefs/v11/homepage_site_pref_tab_bott.gif width=198 | personalization[13] |
|---|---|
| [ANCHOR] [TITLE]e-business logo:IBM e-business<br>http://www.ibm.com/jp/e-business/<br>[DNODEID]15<br>[DESCRIPTION]e-business, The Next Step<br>[RIMAGE]http://www.ibm.com/jp/images/img_ebusiness.gif width=36<br>@ | e-business[13] logo[TO] |
| [ANCHOR] [TITLE]spring option campaign:Campaign of Peripheral Devices<br>http://www.ibm.com/shop/jp<br>[DNODEID]15<br>[DESCRIPTION]Let's expand your PCI until 31st May<br>[RIMAGE]http://www.ibm.com/jp/images/spring_campaign.gif width=36 | campaign[11] option[13] spring[11] |
| [ANCHOR] [TITLE]e-business hosting:Hosting Services<br>http://www.ibm.com/services/jp/webhosting/<br>[DNODEID]15<br>[DESCRIPTION]Case studies in e-business<br>[RIMAGE]http://www.ibm.com/jp/images/ehost.gif width=36 | e-business[13] host[12] |

Block Ends

Block Ends         1502    1501

Block Starts [TR]

Block Starts [TD] TYPE=TEXTPARAGRAPHTITLE=[News]

| EMPHASIS [TITLE]<br>[DESCRIPTION] News | news[13] |
|---|---|
| [ANCHOR] [TITLE]The World Fastest IA Server announced<br>http://www.ibm.com/news/jp/2002/03/03131.html<br>[DNODEID]17 | IA[TO] server[14] fast[AD] world[12] announce[13] |
| [ANCHOR] [TITLE]New VoiceType with Improved Usability<br>http://www.ibm.com/news/jp/2002/03/03181.html<br>[DNODEID]17 | VoiceType[14] improve[11] new[AD] usability[11] announce[13] |
| [ANCHOR] [TITLE]"IBM Design from Japan" Released<br>http://www.ibm.com/news/jp/2002/03/03151.html<br>[DNODEID]17 | Design[TO] IBM[OR] Japan[CO] from[TO] release[13] |
| [ANCHOR] [TITLE]Starter Kit for Wireless LAN for Easy Setup<br>http://www.ibm.com/news/jp/2002/03/03182.html<br>[DNODEID]17 | starter kit[TO] setup[13] easy[AD] wireless LAN[14] |
| [ANCHOR] [TITLE]Other news/press release<br>http://www.ibm.com/news/jp<br>[DNODEID]17 | news[13] press release[13] |

Block Ends

⋮

INFORMATION SEARCH SYSTEM, INFORMATION SEARCH METHOD, HTML DOCUMENT STRUCTURE ANALYZING METHOD, AND PROGRAM PRODUCT

BACKGROUND OF THE INVENTION

1. Field of the Invention

The present invention relates to a technique for automatically acquiring desired information via a network and, in particular, relates to a technique for searching through web content offered on the Internet by crawling through links so as to acquire desired information.

2. Description of the Related Art

Recently, computer network environments as represented by the Internet have become widespread. Search engines are generally utilized to retrieve and acquire desired information from enormous amounts of information offered on such networks. Many kinds of search engines are available. If a static search engine is utilized, information is acquired and stored in advance; the stored information is extracted by a user depending on a search request. However, inasmuch that an enormous amount of information sources (web pages, etc.) should be objects to be searched, it is difficult to acquire the latest information using static search engines. Further, since it is assumed that a server having a search engine basically implements all processing, a load of the server is large.

Therefore, a technique has been proposed wherein a set of keyword search results collected by a static search engine is used as an initial set, and relevant sites are dynamically searched using it as the starting point. One known conventional search technique of this kind is a search technique called "Shark-Search". Discussions of this technique can be found in:

Michael Herscovici, Michal Jacovi, Yoelle S. Maarek, Dan Pelleg, Menachem Shtalhaim, Sigalit Ur. "The Shark-Search Algorithm: An Application: Tailored Web Site Mapping" In the Proceedings of WWW7, the 7th International World Wide Web Conference, Brisbane, April 1998. This article also appeared in the Journal of Computer Networks and ISDN 30 (1998), pp 317-326. HYPERLINK "http://www7.scu.edu.au/programme/fullpapers/1849/com1849.htm".

The technique disclosed in this literature dynamically searches, based on specified URL (Uniform Resource Locator) and keywords, web sites (web sites with high degrees of significance) that are relevant to the specified keywords, from a web site of the specified URL on the Internet. This system aims to improve the accuracy using two types of keywords, i.e., keywords (Domain Query) for deriving an initial set and keywords (Focused Query) that are used in calculating the degrees of significance of web sites upon dynamically crawling the web sites.

As described above, in order to efficiently search through enormous amounts of the latest information on the network, it is necessary to search dynamically when a search request is made.

However, the foregoing conventional dynamic search engine basically performs a search based on one judgment criterion (relevance ( )) that information is close to a topic (keyword, etc.) specified by a user. Therefore, it has been unable to carry out a search flexibly with a variety of strategies depending on a purpose of use of information.

Further, in order to efficiently search information, it is necessary to judge the degrees of significance of acquiring information (web pages, etc.) and determine an acquiring order and an acquiring range of the information based thereon. However, because of the conventional technique of crawling the web sites based on the URLs and topic on the Internet, it has been difficult to effectively judge such degrees of significance. Specifically, since only limited information for judging the degree of significance of information, e.g., specified keywords and text described in a position near anchors in a web page, are used, it has been difficult to efficiently retrieve desired information. For example, in case of the conventional technique disclosed in the foregoing Herscovic article described above, there is a description that text near an anchor (anchor_text_context) is taken into account for judging the degree of significance of such an anchor, but there is no definite description as to how to obtain that anchor_text_context.

SUMMARY OF THE INVENTION

Therefore, it is an object of the present invention to enable a flexible information search based on a variety of strategies depending on a purpose of use of information.

It is another object of the present invention to perform a search effectively utilizing information included in a web page for realizing such an information search based on the variety of strategies in crawling web sites.

For accomplishing the foregoing objects, the present invention is realized as an information search system that crawls web sites via a network, which is configured as follows. Specifically, this information search system comprises structure analyzing means for analyzing a structure of a source code taking into account a meaning in a prescribed web page; significance calculating means for calculating a degree of significance of a web site linking from said prescribed web page, based on an analysis result of said structure analyzing means; and crawling means for crawling the web site depending on the degree of significance calculated by said significance calculating means.

More specifically, said significance calculating means calculates the degree of significance of said web site selectively using a strategy that is for calculating the degree of significance of said web site, from among strategies that are provided in advance. Preferably, said significance calculating means selects plural strategies and uses them by giving weights thereto, respectively.

Another information search system according to the present invention comprises document structure analyzing means for analyzing a document structure of an HTML document taking a meaning thereof into account, and adding an information element acquired by the analysis to a corresponding anchor; and crawling means for crawling a web site linking from said anchor, depending on a degree of significance of said anchor calculated based on said information element acquired through the analysis of said document structure analyzing means.

Specifically, said document structure analyzing means groups respective information elements forming said HTML document into blocks each unified in terms of a meaning of said information elements, and adds the information element in each block to an anchor in the same block as additional information.

This information search system can be further provided with significance calculating means for calculating the degree of significance of said anchor based on said information element acquired through the analysis of said document structure analyzing means and according to preselected prescribed strategies. This enables said crawling means to crawl the web site depending on the degree of significance of said anchor calculated by said significance calculating means according to the prescribed strategy.

Further, for accomplishing the foregoing objects, the present invention is realized as an information search method that crawls web sites via a network using a computer, which is configured as follows. Specifically, this information search method comprises a step of acquiring web pages as initial information and storing source codes into a storage device; a step of reading the source codes of said web pages from said storage device, and conducting a structure analysis taking into account a meaning in said web pages; a step of calculating a degree of significance of a web site linking from said web pages, based on the result of said structure analysis; and a step of accessing the web sites depending on the calculated degree of significance to acquire contents thereof.

Further, the present invention is also realized as the following HTML document structure analyzing method, which can be used in the foregoing information search method and so forth. Specifically, this HTML document structure analyzing method comprises a step of blocking information elements forming an HTML document being a processing object based on tags of said HTML document, and a step of, in the blocked structural data of said HTML document, updating block structures of said HTML document by associating the information elements that are mutually relevant in terms of a meaning.

More specifically, the step of updating the block structures of said HTML document comprises a step of identifying an unnecessary information element in terms of a purpose of a document structure analysis; a step of deleting a block having no structural meaning; a step of merging said information elements or dividing a block based on contents of said information elements; and a step of merging the block structures based on information contained in each block.

Further, the present invention can be realized as a program product for controlling a computer to function as the foregoing information search system, or as a program product for causing a computer to execute processes corresponding to the respective steps in the forgoing information search method or HTML document structure analyzing method. This program product can be offered through distribution via magnetic disks, optical disks, semiconductor memories or other storage mediums that store the program product, or via a network.

BRIEF DESCRIPTION OF THE DRAWINGS

FIGS. 5A and 5B are diagrams showing examples of unnecessary information elements analyzed through the document structure analysis processing of the preferred embodiment;

FIG. 6 is a diagram for explaining an example of merging information elements through the document structure analysis processing of the preferred embodiment;

FIG. 7 is a diagram for explaining another example of merging information elements through the document structure analysis processing of the preferred embodiment;

FIG. 8 is a diagram for explaining still another example of merging information elements through the document structure analysis processing of the preferred embodiment, wherein the state before merging is shown;

FIG. 9 is a diagram for explaining the state after merging the information elements in the example of FIG. 8;

FIG. 10 is a flowchart for explaining operations of calculating the degrees of significance by a significance calculating section, and acquiring the contents of web sites by a crawling executing section according to the preferred embodiment;

FIG. 12 is a diagram showing an example of a site set of web sites referring to the same matter;

FIG. 15 is a diagram showing structural data in the state where the document structure analysis is further implemented from the state of FIG. 14.

DESCRIPTION OF THE PREFERRED EMBODIMENT

Hereinbelow, the present invention will be described in detail based on a preferred embodiment shown in the accompanying drawings.

Figure 1:
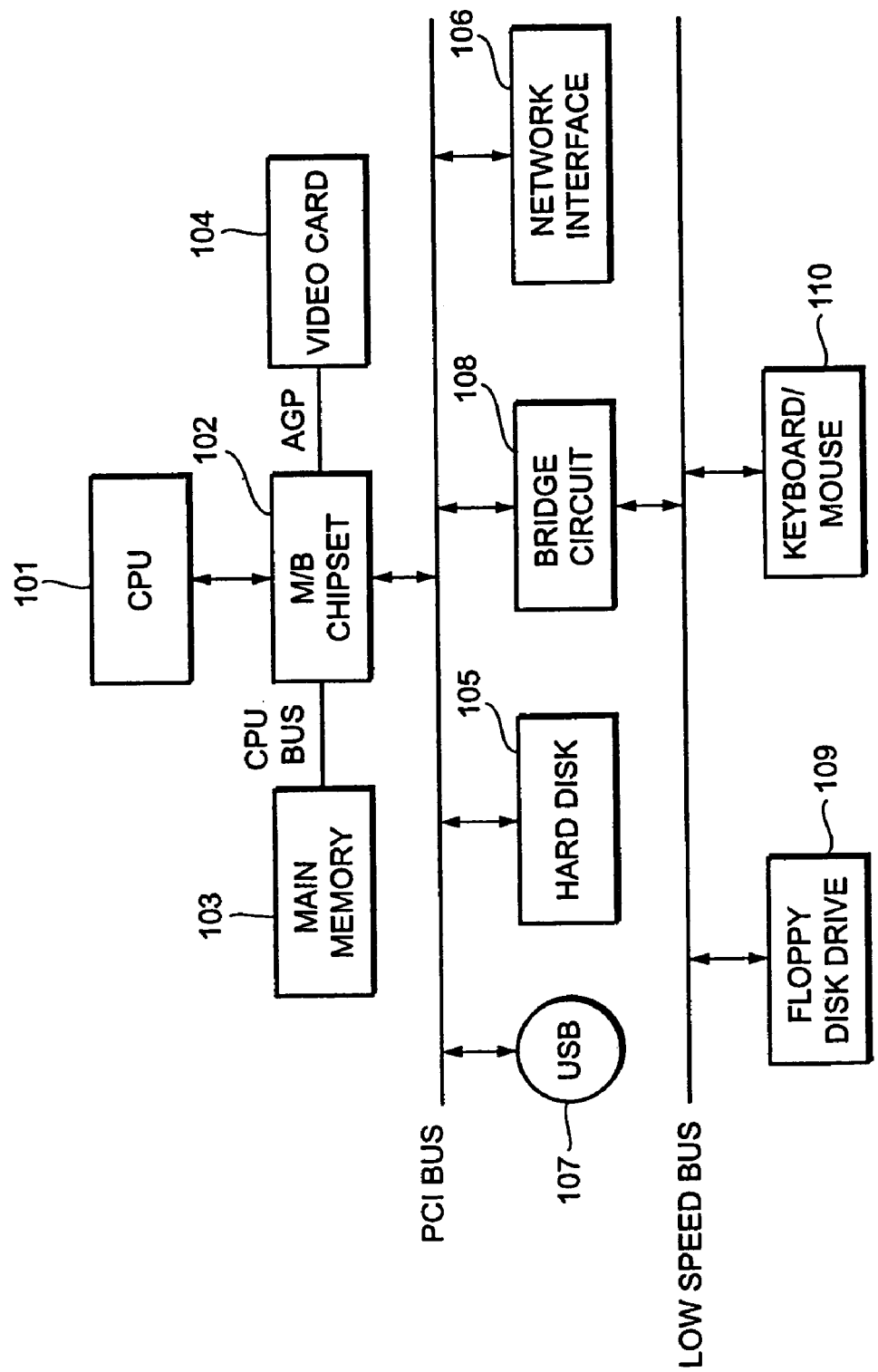
FIG. 1 is a diagram exemplarily showing an example of a hardware structure of a computer apparatus that is suitable for realizing an information search system according to a preferred embodiment of the present invention.

FIG. 1 is a diagram exemplarily showing an example of a hardware structure of a computer apparatus that is suitable for realizing an information search system according to this embodiment.

The computer apparatus shown in FIG. 1 comprises a CPU (Central Processing Unit) 101 as calculating means, a main memory 103 connected to the CPU 101 via an M/B (mother board) chipset 102 and a CPU bus, a video card 104 connected to the CPU 101 via the M/B chipset 102 and an AGP (Accelerated Graphics Port), a hard disk 105, a network interface 106 and a USB port 107 that are connected to the M/B chipset 102 via a PCI (Peripheral Component Interconnect) bus, and a floppy disk drive 109 and a keyboard/mouse 110 that are connected to the M/B chipset 102 via the PCI bus, a bridge circuit 108 and a low speed bus such as an ISA (Industry Standard Architecture) bus.

FIG. 1 only exemplifies the hardware structure of the computer apparatus for realizing this embodiment. Thus, as long as this embodiment is applicable, various other structures can be adopted. For example, instead of providing the video card 104, it may also be configured that only a video memory is mounted and image data is processed by the CPU 101, or that a CD-ROM (Compact Disc Read Only Memory) or a DVD-ROM (Digital Versatile Disc Read Only Memory) is provided via an interface such as an ATA (AT Attachment).

In this embodiment, a description will be provided about an example wherein various web content (web pages and objects thereof) offered on the Internet as information are searched to retrieve desired information. Therefore, in this embodiment, the computer apparatus shown in FIG. 1 is connected to the Internet via communication control means realized by the program product controlled CPU 101 and the network interface 106, and accesses web sites.

Figure 2:
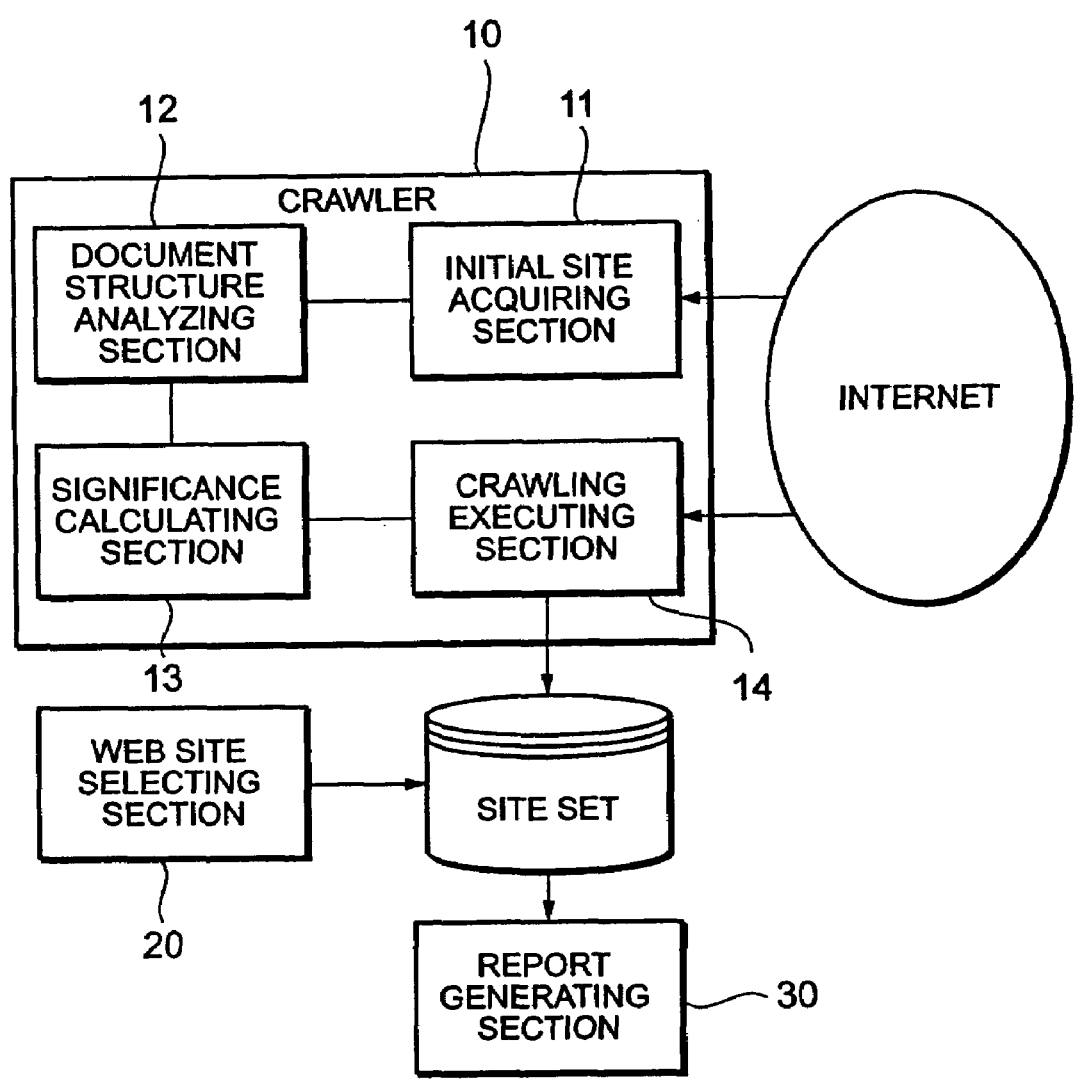
FIG. 2 is a diagram showing a structure of the information search system according to the preferred embodiment that is realized by the computer apparatus shown in FIG. 1.

FIG. 2 is a diagram showing a structure of the information search system according to this embodiment that is realized by the computer apparatus shown in FIG. 1.

As shown in FIG. 2, the information search system according to this embodiment includes a crawler 10. The crawler 10 serves as an information acquiring unit for following links from a web site on the Internet to search web sites relevant to desired information. The system also includes a web site selecting section 20 for performing selection based on a prescribed condition relative to the web sites searched by the crawler 10, and a report generating section 30 for generating a report based on various strategies according to the web sites selected through the selection implemented by the web site selecting section 20.

The foregoing crawler 10, web site selecting section 20 and report generating section 30 are virtual software blocks realized by controlling the CPU 101 based on a program product loaded into the main memory 103 shown in FIG. 1. The program product that controls the CPU 101 to realize those functions is offered through distribution via magnetic disks, optical disks, semiconductor memories or other storage mediums that store the program product, or via a network. In this embodiment, the program product is inputted via the network interface 106 or the floppy disk drive 108 shown in FIG. 1, a CD-ROM drive (not shown) or the like and stored into the hard disk 105. Then, the program product stored in the hard disk 105 is loaded into the main memory 103 and executed by the CPU 101, thereby realizing the functions of the respective elements shown in FIG. 2.

Figure 3:
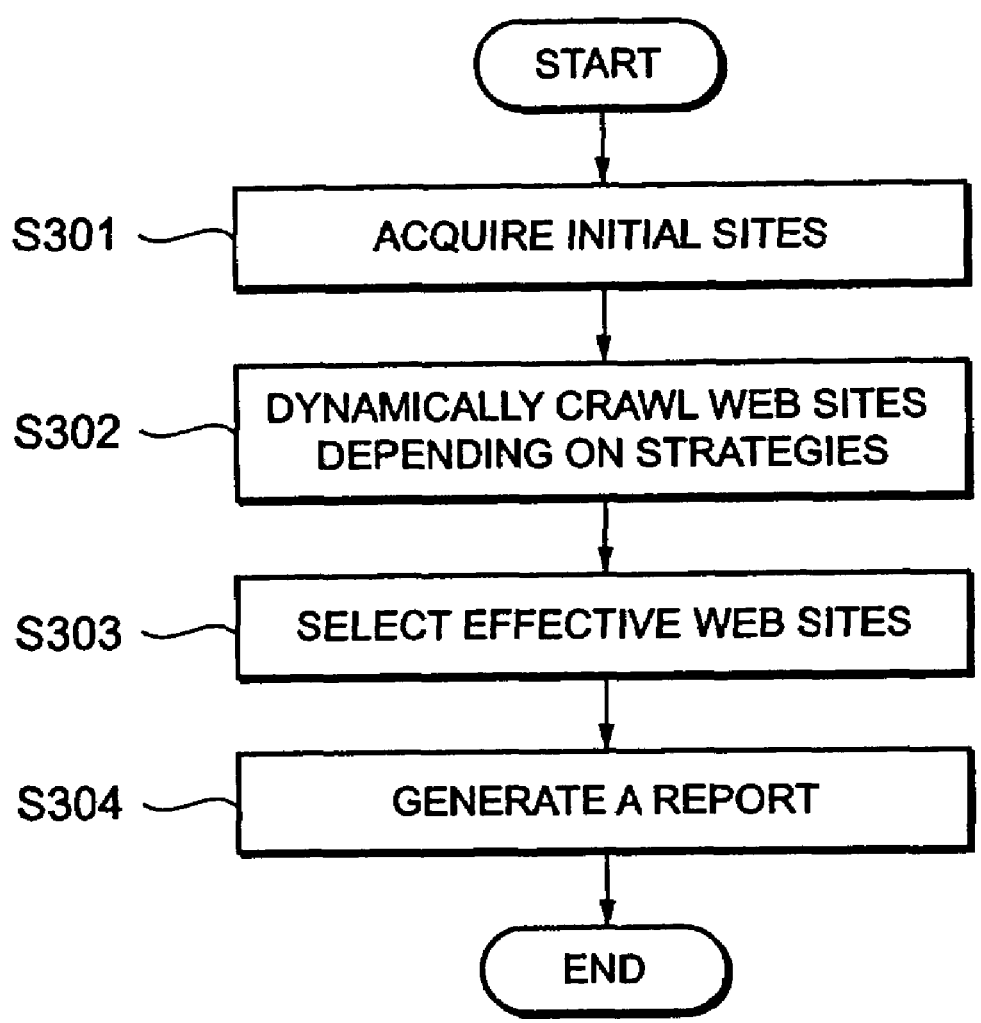
FIG. 3 is a flowchart showing the schematic flow of an information search implemented by the information search system of the preferred embodiment.

FIG. 3 is a flowchart showing the schematic flow of an information search implemented by the information search system of this embodiment.

As shown in FIG. 3, the information search system of this embodiment acquires initial sites via the crawler 10 shown in FIG. 2 (step S301), and dynamically crawls web sites according to various strategies voluntarily selected by a user (step S302).

Here, the initial sites represent a web site or a set of web sites that are initially set for starting crawling of web sites. This is used as an index for performing the further crawling. On the other hand, the strategy represents a policy that is a criterion upon performing crawling of web sites and, specifically, that is set as a search condition, etc. The strategies adopted in this embodiment will be described later in detail.

Subsequently, the information search system selects, using the web site selecting section 20, effective web sites from a set of the web sites searched by the crawling, based on relevance to a topic as a search condition, and a temporal condition (step S303). Then, finally, the information search system carries out evaluation based on the foregoing strategies relative to the web sites selected by the web site selecting section 20, and generates a report (step S304). The generated report is displayed on a display unit in the form of a web page, etc., or stored in a storage device such as the hard disk 105.

In this embodiment, as shown in FIG. 2, the crawler 10 comprises an initial site acquiring section 11 for acquiring initial sites, a document structure analyzing section 12 for performing a document structure analysis for a web page of the initial sites, a significance calculating section 13 for calculating the degrees of significance of web sites being acquiring objects by crawling, based on a result of the analysis made by the document structure analyzing section 12, and a crawling executing section 14 for executing a process of acquiring web sites by crawling.

For acquiring the initial sites in the initial site acquiring section 11, the following methods, for example, can be adopted. These include specifying a URL of a home page (top page) of a specific web site (e.g., corporate site) from which information is to be collected, and conducting a search using an existing search engine relative to keywords to obtain the initial site(s).

When a search engine is utilized, any general search service offered on the Internet, such as those offered on google.com or yahoo.com, can be utilized. When the initial sites are acquired using a search engine, a set of web sites acquired through the search becomes the initial sites (initial site set).

The web site crawling is a process which uses the initial sites as starting points and acquires, based on information such as anchor tags, a new set of web sites which are referred to by the initial sites. The new set of sites are then processed, and those that match specified strategies are selected or acquired. In this process, terminating conditions such as an upper limit on the number of web sites to be acquired, an upper limit in depth and a time limit of crawling are set in advance, and the process is recursively applied until such terminating conditions are satisfied. A user specifies keywords that are used for calculating relevance between individual sites and a topic specified by the user, as a hint for dynamic crawling from the initial set. The crawler 10 conducts, using the document structure analyzing section 12, a document structure analysis of a web page corresponding to the initial site (initial site set), and calculates, using the significance calculating section 13, the degrees of significance of web sites (anchor tags on description of HTML (Hypertext Markup Language)) according to the strategies for crawling, then, using this information, searches and acquires web sites via the crawling executing section 14.

In this embodiment, the document structure analysis conducted by the document structure analyzing section 12 identifies blocks in an HTML document being a source code of a web page.

Here, the block represents a group of information elements having a specific meaning, and does not necessarily agree with a block level in HTML describing a web page. The information elements included in each block are registered in a block attribute (OBJECT_LIST) as an information element list, and stored in the main memory 103 or a cache memory of the CPU 101. Through this blocking operation, mutually relevant information elements among information elements included in an HTML document are associated with each other.

The information elements include a single element and a composite element formed by merging plural single elements. At the beginning of an analysis, all information elements are identified as single elements and, as the analysis proceeds, plural information elements are merged into a composite element. The information elements have the following attributes.

TYPE: Type of Information Element

OBJECT_ANCHOR: Anchor.

OBJECT_TEXT_BLOCK: Text.

OBJECT_IMAGE: Type of Media. Other than this, AUDIO, VIDEO or the like are definable. In the following explanation, OBJECT_IMAGE will be described as representing all media types.

OBJECT_DELIMITER: To be specified when analyzed to serve as a punctuation symbol irrespective of a type of information element.

URL: URL

In case of OBJECT_ANCHOR, a value specified by HREF.

In case of OBJECT_IMAGE etc., a value specified by SRC, etc.

TITLE: Title

In case of OBJECT_ANCHOR, a text portion surrounded by A (anchor) tags.

In case of OBJECT_IMAGE etc., a text portion specified by ALT, etc.

DESCRIPTION: Description

In case of OBJECT_TEXT_BLOCK, a text portion thereof.

In case of OBJECT_ANCHOR, when relevant texts are obtained, to be added as a text description upon merging them.

REFERRER: Reference Information

In case of OBJECT_ANCHOR or OBJECT_TEXT_BLOCK, an information element of another media type such as OBJECT_IMAGE that is relevant thereto, is added.

EMPHASIS: Emphasized Expression

It is specified whether or not an information element is expressed in an emphasized manner.

Figure 4:
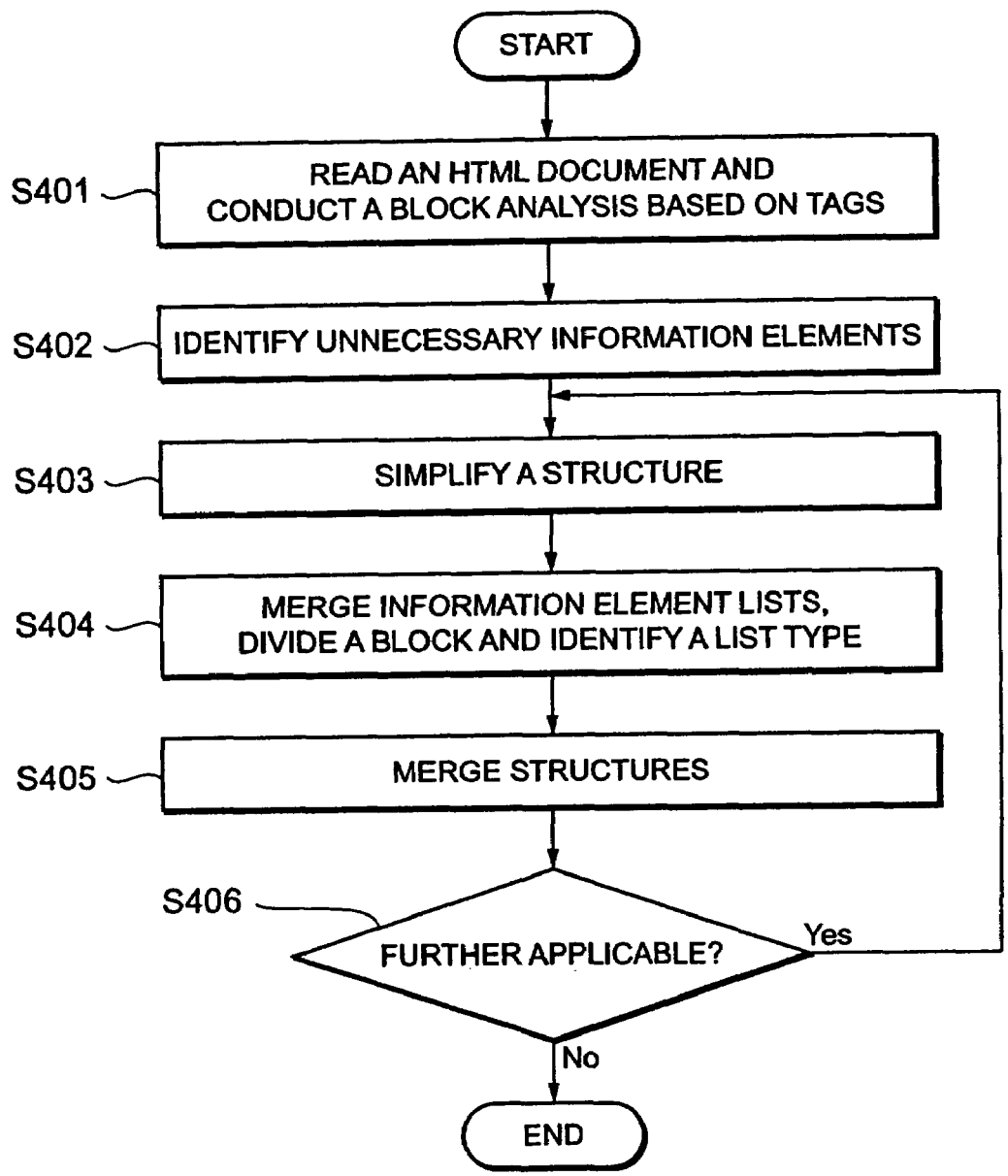
FIG. 4 is a flowchart for explaining a procedure of document structure analysis processing of a web page conducted by a document structure analyzing section of the preferred embodiment.

FIG. 4 is a flowchart for explaining a procedure of document structure analyzing process of a web page that is a blocking algorithm implemented by the document structure analyzing section 12.

Referring to FIG. 4, the document structure analyzing section 12 first reads an HTML document of a web page as an analyzing object, and conducts a temporary block analysis based on description of its tags (step S401). Herein, using as a clue those tags that are frequently described at portions where the meaning is generally punctuated in HTML documents, an HTML document to be processed is temporarily divided into blocks. As examples of the tags to be used in the block analysis, there are cited, for example, "BLOCKQUOTE", "DD", "DIV", "DL", "FORM", "H1", "H2", "H3", "H4", "H5", "HR", "LI", "P", "TABLE", "TDF", "TH", "TR" and "UL". Namely, when one of these tags appears, a block is started. Then, when a corresponding end tag (e.g. </TABLE>) appears, that block is terminated.

On the other hand, when the following tags or texts appear in a block determined as described above, the foregoing information elements are generated in the block.

A (anchor) tag: To produce OBJECT_ANCHOR. A value specified by HREF as URL. To specify a text surrounded by A tags, as TITLE.

Text portion not surrounded by tags: To produce OBJECT_TEXT_BLOCK. To specify this text as TITLE.

Tag specifying media such as IMG: To produce OBJECT_IMAGE etc. In case of an IMG tag, to specify a value specified by SRC, as URL, and a value specified by ALT, as TITLE.

Further, upon generating those individual information elements, it is judged whether or not each information element is in an emphasized expression. If positive, an intensity thereof is specified in an attribute EMPHASIS. Whether or not it is the emphasized expression is judged depending on, for example, whether or not such an information element is surrounded by tags such as "B", "CENTER", "EM", "STRONG", "TH" or "U".

The structural data of the HTML document obtained as described above is temporarily stored in the main memory 103 or the cache memory of the CPU 101 shown in FIG. 1.

Then, the document structure analyzing section 12 reads the structural data generated at step S401 from the main memory 103 or the like, and identifies unnecessary information elements among the information elements included in the structural data (step S402). When there appear plural OBJECT_IMAGE having the same URL, plural OBJECT_ANCHOR having the same TITLE or plural OBJECT_TEXT_BLOCK having the same DESCRIPTION, they have only a small significance in terms of carrying information and merely serve as punctuation symbols. Thus, it can be said that they are unnecessary information elements. For example, image tags as shown in FIG. 5A serve to perform a role of punctuation like an LI tag. Likewise, anchor tags as shown in FIG. 5B have only a small significance in terms of carrying information.

While counting the number of information elements that appear in an HTML document, such information elements that have only a small significance of carrying information are identified and a type thereof is marked as OBJECT_DELIMITER. Specifically, with respect to an unnecessary image, marking is carried out using the following algorithm. Identity of images is judged based on whether or not URL is the same.

When one block only includes one image, it becomes a candidate of OBJECT_DELIMITER. When one block only includes the plural same images, they become candidates of OBJECT_DELIMITER. OBJECT_DELIMITER is marked relative to those that are candidates in plural blocks in the whole document.

On the other hand, with respect to unnecessary OBJECT_ANCHOR and OBJECT_TEXT_BLOCK, if the number of elements having the same TITLE is no less than a predefined threshold value, they are marked as OBJECT_DELIMITER. In the judgement using such a threshold value, if, for example, a text length is relatively short (12 bytes or less) and the number of times of appearing is three or greater, they are deemed as unnecessary elements. Further, the same OBJECT_ANCHOR and OBJECT_TEXT_BLOCK that appear quite frequently (e.g., 10 times or more) in the same document are also deemed to be unnecessary elements. As these threshold values, suitable values can be derived experientially or through a proper number of times of experiments, depending on operation environments and uses of the system. In the foregoing example, the text length is derived experientially from the result of observing the actual web pages on the Internet (e.g., "go to top", "back" or "cache" corresponds to this example). Likewise, the threshold value about the number of times of appearing is also derived experientially from the result of the actual observation (e.g., anchor such as "Add to my cart" in shopping sites).

The anchors judged to be unnecessary as described above are not crawled.

Then, the document structure analyzing section 12 deletes a structurally meaningless block (step S403). For example, with respect to a certain block, if that block itself has no information elements and contains only one block (child block), the subject block is merged with the subordinate block, i.e., such a child block.

Then, the document structure analyzing section 12 merges information element lists, divides a block and identifies a list type (step S404). First, information elements in the same block are merged. Through this operation, plural relevant elements are merged into one composite element. Concrete examples are cited hereinbelow.

OBJECT_ANCHOR can be merged with OBJECT_ANCHOR, OBJECT_TEXT_BLOCK or OBJECT_IMAGE, and merging is implemented through the following operation.

Merging between OBJECT_ANCHOR and OBJECT_ANCHOR:

Merging is carried out only when URLs of two information elements are the same. One of them assigned an EMPHASIS attribute is deemed to be significant, and its TITLE is adopted. Then, with respect to the other not assigned an EMPHASIS attribute, its TITLE is added to DESCRIPTION.

Merging between OBJECT_ANCHOR and OBJECT_TEXT_BLOCK:

DESCRIPTION of OBJECT_TEXT_BLOCK is added to DESCRIPTION of OBJECT_ANCHOR.

Merging between OBJECT_ANCHOR and OBJECT_IMAGE:

OBJECT_IMAGE is set in REFERRER of OBJECT_ANCHOR. TITLE of OBJECT_IMAGE is added to DESCRIPTION of OBJECT_ANCHOR.

Further, OBJECT_TEXT_BLOCK can be merged with OBJECT_ANCHOR, OBJECT_TEXT_BLOCK or OBJECT_IMAGE. In case of merging with OBJECT_ANCHOR, the operation is the same as that between OBJECT_ANCHOR and OBJECT_ANCHOR as described above. In case of merging with OBJECT_IMAGE, the operation is the same as that between OBJECT_ANCHOR and OBJECT_IMAGE as described above. In case of merging between OBJECT_TEXT_BLOCK and OBJECT_TEXT_BLOCK, merging is carried out through the following operation.

Merging between OBJECT_TEXT_BLOCK and OBJECT_TEXT_BLOCK:

DESCRIPTION of one OBJECT_TEXT_BLOCK is added to DESCRIPTION of the other OBJECT_TEXT_BLOCK.

Basically, if OBJECT_ANCHOR, OBJECT_TEXT_BLOCK and OBJECT_IMAGE exist in the same block, it is judged that they can be put together. With respect to OBJECT_ANCHOR, if an element referring to the same URL exists nearby, elements contained therein are merged into one composite element.

When three or less (four or less when including OBJECT_DELIMITER) information elements are contained in the same block, it can be easily judged how to merge them. On the other hand, when plural information elements are in the same level of a list, a structural analysis in the information element list is conducted to merge the elements or divide the block. The structural analysis in the information element list is basically implemented in the following manner using N-gram statistics.

Specifically, an analysis is started from one gram and, if a sequence of dominant elements is found in the same block in certain grams, such a sequence is divided out. For example, in 3-gram statistics, when the ratio (cover rate) of OBJECT_DELIMITER, OBJECT_ANCHOR and OBJECT_TEXT_BLOCK relative to the whole block becomes no less than a threshold value (e.g., 80%), a sequence thereof is divided out and the information elements are merged. Specifically, in an example shown in FIG. 6, two composite elements are generated (bullet.gif portions surrounded by broken lines) is analyzed as OBJECT_DELIMITER). The reason why the threshold value is not necessarily set to 100% is that even when elements are enumerated in a block, there are differences with respect to individual elements such that there is an image or not, so that it is necessary to experientially determine the threshold value to handle varieties of expressions (in the example of FIG. 6, a sequence of OBJECT_DELIMITER, OBJECT_ANCHOR and OBJECT_TEXT_BLOCK appears two times and, inasmuch as it covers the whole block, the cover rate is 100% in this case).

However, there are those instances where the analysis can not be achieved only by the N-gram analysis. For example, it is the case as in an example shown in FIG. 7 where reference information (portion surrounded by dotted line) is described. In such a case, association with respect to, particularly, OBJECT_ANCHOR or OBJECT_TEXT_BLOCK can not be provided by the N-gram statistics. Accordingly, keywords are extracted from text portions of TITLE and DESCRIPTION assigned to information elements, and the degree of agreement (ratio and number) of keyword lists between information elements is checked and, when the degree of agreement is no less than a predefined threshold value, those information elements are merged. For example, when the ratio of agreement between keywords extracted from TITLE of two information elements is no less than 70%, merging is performed. Upon calculating the degree of agreement, classification of the keywords may be taken into account so that it is possible to calculate the degree of agreement by increasing weights for names of persons and organizations, and so forth. For example, in case of information such as news, when, particularly, names of persons or organizations agree with each other, the degree of relevance is high in many cases.

In an example shown in FIG. 8, two groups each merged in terms of the meaning exist in one block. Portions surrounded by dotted lines ("IBM-Related Links" and "IBM Japan-Related Links") form the respective groups each merged in terms of the meaning. In such a case, an information element list is divided into blocks using, as punctuation, information elements that are identified as titles. For identifying an information element as a title, an EMPHASIS attribute is used. Specifically, when plural information elements with specified EMPHASIS attributes exist in an information element list having a length no less than a predefined threshold value and subsequent information elements have a similar pattern of a sequence, the list is divided into plural blocks. As a result, as titles of the blocks, titles of the EMPHASIS attributes are specified. Through this processing, the HTML document of FIG. 8 is divided into blocks as shown in FIG. 9.

In general, if an EMPHASIS attributes is given to an information element at the top of an information element list and the ratio of OBJECT_ANCHOR in the information element list is no less than a predefined threshold value (e.g., 80%), a title of such an EMPHASIS attribute is specified as a title of a block. Or, similarly, if only the top of a list is OBJECT_TEXT_BLOCK and the rest of elements are OBJECT_ANCHOR with no less than a threshold value (e.g., 80%), DESCRIPTION of the top OBJECT_TEXT_BLOCK is used as a title of a block. As for these threshold values, suitable values can be derived experientially or through a proper number of times of experiments, depending on operation environments and uses of the system.

The title of the block thus extracted is used in calculating the degrees of significance relative to individual information elements. For example, in the example shown in FIGS. 8 and 9, if a topic is "IBM Japan", three anchors "Home", "Products & Services" and "Support & downloads" contained in the subject block do not include a character string "IBM Japan", but, through inclusion in the title of the block, are judged to be relevant information elements. By analyzing the document structure in detail and accurately as described above, it is possible to utilize not only a text nearby, but also a correlation between elements in distant positions.

Further, when the ratio of OBJECT_ANCHOR is high in an information element list of an extracted block, a list type of the subject block is determined in the following manner.

SITE_MAP: In case the rate of the number of links of different host names of OBJECT_ANCHOR, relative to the whole number of links is no greater than a predefined threshold value (e.g., 50%). In cases other than such a case, minimum character strings for identifying specific organization names are derived from the host names and, when the ratio of links of the obtained different character strings is no greater than a prescribed threshold value (e.g., 10%), SITE_MAP is set. These threshold values are derived, for example, experientially based on the actual web pages on the Internet. The strict agreement in matching host names sometimes causes unmatches even in case of those pages offered by the same company. This is because the same company has different host names depending on the services they provide. For example, Yahoo! Japan (http://www.yahoo.co.jp) uses different host names, such as auctions.yahoo.co.jp for auctions, and travel.yahoo.co.jp for travels. In this case, using the degree of agreement of the minimum character string (yahoo.co.jp) for identifying the specific organization, judgement based on a threshold value can be performed.

LINK_LIST: In case the condition of SITE_MAP is not satisfied.

Then, the document structure analyzing section 12 merges block structures based on the information for each block obtained as described above (step S405).

Relevant information elements do not necessarily appear in the block in a continuous manner. Specifically, it is possible that blocks are divided smaller than what they are through the processing at steps S401 and S404. Therefore, for example, if there is a parallel structure in child blocks of a certain block, it is used as an information element list of the subject block (parent block), thereby merging the structures. The method of merging is the same as the algorithm of merging the information element lists as described with respect to step S404.

The document structure analyzing section 12 repeatedly applies the foregoing processing of steps S403 to S405 to the HTML document as long as it is applicable thereto and, when the structure of the structural data being the analysis result is not changed, stores such structural data into the main memory 103 or the cache of the CPU 101, thereby terminating the structure analysis processing (step S406).

As described above, the document structure of the HTML document is grouped into blocks each merged in terms of the meaning, and the information elements extracted from the HTML document are identified as the attributes of the blocks, so that the mutually relevant information elements are associated with each other and added to the anchors in each block.

Now, calculation of the degrees of significance of web sites (i.e., anchor tags in HTML documents) to be crawled, implemented by the significance calculating section 13 will be described.

Figure 11:
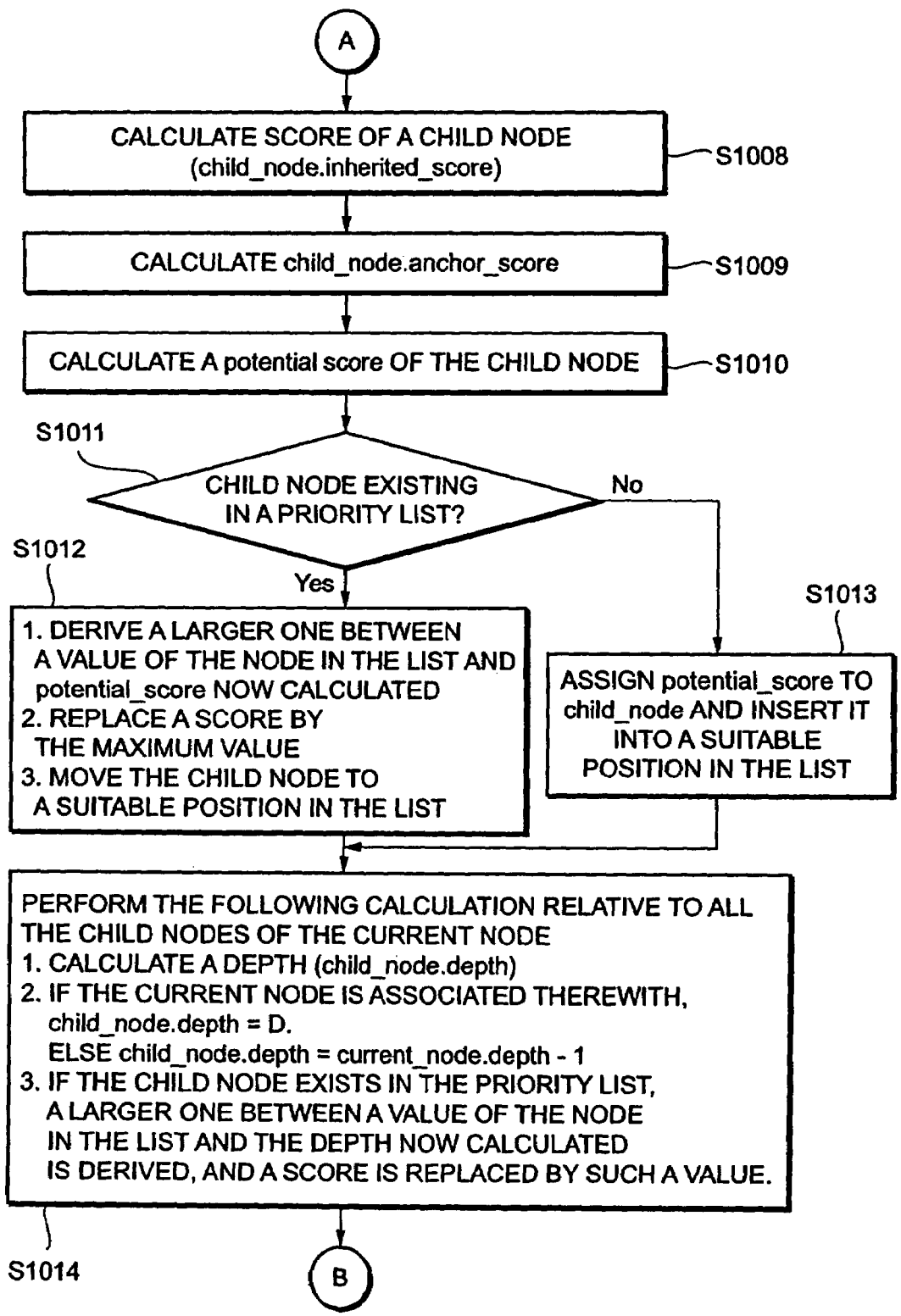
FIG. 11 is a flowchart for explaining operations of calculating the degrees of significance by the significance calculating section, and acquiring the contents of web sites by the crawling executing section according to the preferred embodiment.

FIGS. 10 and 11 are flowcharts for explaining operations of calculating the degrees of significance by the significance calculating section 13, and acquiring the contents of web sites by the crawling executing section 14.

In this embodiment, the basic algorithm (algorithm to be described referring to FIGS. 10 and 11) that is used for calculating the degrees of significance in the significance calculating section 13 is based on the technique called Fish-Search and the technique called Shark-Search disclosed in the foregoing Herscovici article. A discussion of the Fish-Search technique can be found in: P. De Bra, G.-J Houben, Y. Kornatzkt, and R. Post, Information Retrieval in Distributed Hypertexts, in Proceedings of RIAO'94, Intelligent Multimedia, Information Retrieval Systems and Managements, New York, N.Y., 1994.

However, the technique in this embodiment is extended in that scores (degrees of significance) of web sites being search objects are calculated based on strategies specified by a user and information elements added to anchors through the analysis by the document structure analyzing section 12, and objects of crawling are dynamically determined depending on the scores, and in that, by presenting a keyword list to the user, an interaction is made possible for collecting web sites that are more suitable to the purpose of the user.

Further, among meaningful composite information elements extracted as the result of the analysis by the document structure analyzing section 12, only those having reference to other documents become candidates of crawling.

Referring to FIGS. 10 and 11, first, the setting of parameters and the initial setting are implemented through an operation, by a user, of input means of the computer apparatus constituting the information search system in this embodiment (step S1001). Specifically, an initial node set (initial sites, hereinafter, web sites to be crawled will be referred to as "nodes"), a search width, a search depth (D), the size (S) of the initial node set, the time limit, keywords for search (Domain Query and Focused Query), a strategy (STSET) and so forth are set. Upon strategy setting, plural strategies can be selected and weighting can be carried out relative to the respective strategies. Further, as the number of times of crawling, 0 (crawlingCount=0;) is set.

Then, the significance calculating section 13 sets depths of individual nodes of the initial node set to parameters D and insert them into a vacant list (hereinafter referred to as "node list")(step S1002). Structural data as the result of the analysis by the document structure analyzing section 12 is read from the main memory 103 or the like. Then, while the node list is not vacant, the number of the processed nodes is smaller than the parameter S, and it is within the time limit, the next processing is repeatedly executed (step S1003).

First, the number of times of crawling is increased by 1 (crawlingCount+=1;)(step S1004). Here, if crawlingCount exceeds a fixed increment (e.g., per 100 sites) and calculation of strategicScore is global, recalculation of strategicScore is performed to replace values of scores (scores of individual nodes, i.e., degrees of significance of anchors linking to web sites being the respective nodes) in the node list (step S1005). As described later, with respect to those in which relevant keywords are extracted, a list of those keywords is presented to prompt selection by the user. When the user selects some keywords, a topic is updated depending on the selected keyword. During this time period, the crawling may be once suspended, but it is also possible to continue the crawling.

Then, the top node is extracted from the node list and set as a current node. This current node is stored in the main memory 103 or the cache of the CPU 101 shown in FIG. 1, and read out by the crawling executing section 14. Then, the crawling executing section 14 accesses the Internet via the network interface 106 and acquires the contents (web page and various data) having an URL of the current node (step S1006). The acquired contents are stored in the storage device such as the main memory 103 or the hard disk 105 shown in FIG. 1.

Then, the significance calculating section 13 checks the search depth (parameter D) for the current node and, if depth>0, calculates relevance of the current node according to the following procedure (step S1007).

First, a score (child_node.inherited_score) of a node linking from the current node (hereinafter, such a node will be referred to as "child node") is calculated (step S1008 in FIG. 11). This calculation procedure is as follows.

> If relevance(current_node)>0, then,
>     child_node.inherited_score=*d*\*strategicScoreForPage(STSET, current_node)

wherein d is a damping constant defined in advance that is greater than 0 and smaller than 1.

> Else
>     child_node.inherited_score=*d*\*current_node.inherited_score.
> Then, child_node.anchor_score is calculated (step S1009).
>
> child_node.anchor_score=(relevance(anchor)+strategicScoreForAnchor(STSET, anchor))/2.

Then, a potential score of the child node is calculated (step S1010).

> child_node.potential_score=g\*child_node.inherited_score+
> (1−g)\*child_node.anchor_score wherein g is a constant defined in advance that is greater than 0 and smaller than 1.

Then, the significance calculating section 13 implements the following calculation relative to all the child nodes of the current node (step S1011 to S1013).

If the child node exists in the priority list, then:

i) a larger one between a value of the child node in the list and potential_score now calculated is derived;

ii) the score is replaced by the maximum value; and iii) the child node is moved to a suitable position in the list.

Else potential_score is assigned to child_node, which is then inserted into a suitable position in the list (in order of scores).

Further, the significant calculating section 13 performs the following calculation for all the child nodes of the current node (step S1014).

A depth (child_node.depth) is calculated.

If the current node is associated therewith, then child_node.depth=0.

Else child_node.depth=current_node.depth−1.

If the child node exists in the priority list, then a larger one between a value of the node in the list and the depth now calculated is derived, and a score is replaced by such a value.

After the processing up to step S1014 is finished or the depth calculated at step S1007 is negative, the procedure returns to step S1003. Then, as long as the respective conditions are satisfied, the number of times of crawling is increased by 1 to repeat the processing at step S1004 and subsequent steps. And, if any of the conditions at step S1003 is not satisfied, the processing by the significance calculating section 13 and the crawling executing section 14 is finished.

Now, individual calculating methods in the foregoing algorithm will be described.

Calculating Method of Relevance(current_node)

Domain Query and Focused Query are expressed in the form of vectors (topic vectors). The degree of agreement between these Queries (keywords) and the text is calculated based on a distance (inner product etc.) between the vectors. Text in current_node is converted into a vector and similarity between the vector and the topic vector is calculated. A keyword that is judged to be irrelevant through specification by the user has a minus significance in a topic vector. These are calculated by the following equation.

> relevance(current_node)=Similarity(current_node, Domain Query)+Similarity(current_node, Focused Query).

Calculation Method of Relevance(Anchor)

> relevance(current_node)=Similarity(TITLE, Domain Query)+Similarity(DESCRIPTION, Focused Query).

Calculation Method of strategicScoreForPage(STSET, current_node)

It is determined based on the sum of score weighting per strategy specified by the user. The value is normalized between 0 and 1. A calculation method of scores (strategicScoreForPage(ST, current_node)) for individual strategies will be described later.

Calculation Method of strategicScoreForAnchor(STSET, anchor)

It is determined based on the sum of score weighting for each strategy specified by the user. The value is normalized between 0 and 1. A calculation method of scores (strategicScoreForAnchor(ST, anchor)) for individual strategies will be described later.

Now, the strategies used in crawling in this embodiment and their types, and the calculation methods of strategicScoreForPage(ST, current_node) and strategicScoreForAnchor(ST, anchor) will be described using examples.

The strategies used in this embodiment include two types of strategies, i.e.,local strategies and global strategies. The local strategy can determine the degree of significance only by information within a web page, while the global strategy calculates the degree of significance by analyzing plural web pages.

Search Web Site Close to Topic Specified by User (Local Strategy)

This strategy is calculated by relevance(current_node) and relevance(anchor), and incorporated in the basic algorithm shown in FIGS. 10 and 11.

Search Significant Web Site (Global Strategy)

This is a strategy wherein if the same information is offered in many web sites, such information is deemed to be significant. Inasmuch as it is necessary to check plural web sites to see whether the same information exists, this strategy can be said to be global. Whether or not plural web sites offer the same information can be known by using a known technique that extracts headlines from the web pages. One such technique is described in: Takeda and Nomiyama, "Site-Outlining—Information Collection from the Internet and Visualizing Technique—", Information Processing, vol. 42, No. 8, 2001, In this method, only a set of information elements resultantly referring to the same matter is extracted. For example, those web sites having headlines as shown in FIG. 12 will be searched. In FIG. 12, Sites 2 to 4 are child nodes of Site 1. Further, in this method, keywords and their weights are extracted from text part of information elements forming the extracted headlines to produce a characteristic keyword list. In an example of FIG. 12, keywords "Lotus", "Tivoli", "IBM Japan" and "unify" ("unified" is extracted as its base form "unify" by using natural language processing) identified as principal elements and their weights are enumerated in the characteristic list.

With respect to a new information element contained in the headlines, a distance between a keyword list extracted from a text part of a corresponding node and the characteristic keyword list of the headlines is calculated (the distance can be derived by inner product, etc.) and the calculated distance is set as the degree of significance.

In this method, strategicScoreForPage(ST, current_node) is calculated based on the sum of the degrees of significance of headlines contained in a web page of the current node. Then, it is divided by the number of anchors in the subject web page so as to be normalized.

On the other hand, strategicScoreForAnchor(ST, anchor) is the maximum value of distances in all characteristic vectors of a currently extracted headline set.

Search Web Site Including Many Relevant Images Etc. (Local Strategy)

By analyzing a document structure of an HTML document, it becomes possible to associate a text with other media types (e.g., an Image, Audio, Video or a document file (e.g., PDF (Portable Document Format)) defined in MIME (Multipurpose Internet Mail Extensions) type). The degree of significance is calculated based on whether or not a text part has relevance to a topic.

In this method, strategicScoreForPage(ST, current_node) is the total number of relevant images contained in a web page of the current node, and is divided by the total number of images in the subject web page so as to be normalized.

Further, with respect to strategicScoreForAnchor(ST, anchor), the degree of significance is set to 1 in case of relevant images, while otherwise, the degree of significance is set to 0.

Search Based on Information Including Significant Keywords (Global Strategy)

Clustering is performed based on keywords extracted from information of a text, and the degree of significance is judged based on whether or not many keywords that are judged to be significant in each cluster are contained. This method is disclosed in detail in JP-A-2001-325272.

In this method, strategicScoreForPage(ST, current_node) is calculated based on the sum of degrees of significance of elements including hot words contained in a web page of the current node. Then, it is divided by the total number of anchors in the subject web page so as to be normalized.

Further, strategicScoreForAnchor(ST, anchor) is set to a value of its degree of significance (no less than 0 and no greater than 1) when a certain element includes a hot word, while otherwise, it is set to 0.

Search Based on the Number of Anchors (Local Strategy)

The degree of significance is judged based on the total number of anchors existing in a web page of the current node.

In this method, strategicScoreForPage(ST, current_node) is calculated based on the total number of anchors included in the web page of the current node. When calculating the degree of significance locally, for example, the number of links is divided into 11 degrees (0, 1, 2, 3, 4, 5, 6, 7, 8, 9 and more), and a score (value from 0 to 1) is given to each of them. When calculating the degree of significance globally, it is normalized with the number of anchors in a web page that includes the maximum number of anchors in a searched web site set.

Further, strategicScoreForAnchor(ST, anchor) is all set to 0.

Search Based on Time Period Limitation (Local Strategy)

A time period in which information appearing in a web page is updated is limited. When a last modified date obtained by an HTTP protocol is within the limited time period, the degree of significance is set to 1, while otherwise, the degree of significance is set to a value obtained by normalizing the number of days exceeding the time period.

Search Based on Link List (Local Strategy)

The degree of significance is set to the number of links contained in a link list obtained by a document structure analysis of an HTML document.

Search Based on the Number of Referred Links (Global Strategy)

The degree of significance is set to the number of links referred by other web sites.

Search Based on the Number of References (Global Strategy)

The degree of significance is set to the number of links referring to a web page of the current node.

As described above, the crawler 10 crawls web sites using strategies selected by the user and acquires a set of the searched web sites (hereinafter referred to as "site set"). The acquired site set is stored in the storage device such as the main memory 103 or the hard disk 105, along with the contents individually acquired at step S1006.

The web site selecting section 20 selects unnecessary web sites from among the site set stored in the storage device such as the main memory 103, and deletes the selected web sites and the contents thereof. As the unnecessary web sites, there can be cited web sites having no relevance to the topic and web sites that do not satisfy the temporal condition.

The crawler 10 performs the crawling based on keywords representing a topic specified by the user and according to specified strategies. However, it is possible that the acquired site set includes those web sites having low or no relevance to the topic specified by the user. Therefore, the degree of agreement relative to the topic is derived with respect to the site set acquired by crawling, and irrelevant web sites are deleted from the site set. On the other hand, those web sites located between plural web sites that were judged to have relevance in a reference structure obtained upon crawling (in case the link is established via those web sites), are not deleted even if those intermediate web sites themselves have no relevance to the topic.

Further, it is possible that the site set includes those web sites that do not agree with the time specified by the user (those web sites not searched in a specified time period). Therefore, a LAST_MODIFIED attribute obtained by the HTTP protocol and the temporal condition specified by the user are compared with each other relative to the site set acquired by crawling, and disagreed web sites are deleted from the site set.

With respect to the site set searched by the crawler 10 and selected by the web site selecting section 20, the report generating section 30 generates a report in which the sum of scores for each strategy is calculated and normalized, and stores it into the storage device such as the main memory 103 or the hard disk 105. For example, with respect to images, the number of relevant images per site and so forth are included in the report as information. The report may be, for example, generated as an HTML document and displayed in a web browser.

By comparing with the scores of the strategies for plural topics (comparing with the mean value or deriving standard deviation), it is possible to know a tendency as to what strategy the topic agrees with (e.g., there are many images or much information (many bulletin boards etc. are included)).

As described above, according to the information search system in this embodiment, by combining the optimum strategies, the site set that is more suitable to the purpose of the user can be acquired.

Further, since the anchors that are used for crawling are not independent, but properly associated with the corresponding texts, the relevance to the topic can be judged more accurately. Also, meaningless anchors can be excluded in an HTML document through the document structure analysis, so that it is possible to avoid crawling unnecessary web sites.

By utilizing the blocks obtained through the document structure analysis, a correlation between elements that are distant from each other can be utilized in crawling.

By recognizing the blocks, a link list in web pages can be identified, so that a high quality link list can be collected and extracted.

In addition, by presenting relevant keywords to the user during crawling (e.g., at step S1005 in FIG. 10), ambiguity of the specified topic can be eliminated. For example, a topic "jaguar" has ambiguity such that it may represent "car", "animal" or "Mick Jaguar (rock singer)". However, by displaying relevant keywords through clustering to allow the user to specify these relevant keywords, the crawling objects can be narrowed down. Specifically, when wishing to retrieve a car "Jaguar", by specifying relevant keywords such as "Mick Jaguar", "live" and so forth to give a minus degree of significance, it is possible to exclude web sites containing such relevant keywords from the crawling objects, so that the ambiguity of the topic can be eliminated as a result.

Figure 13:
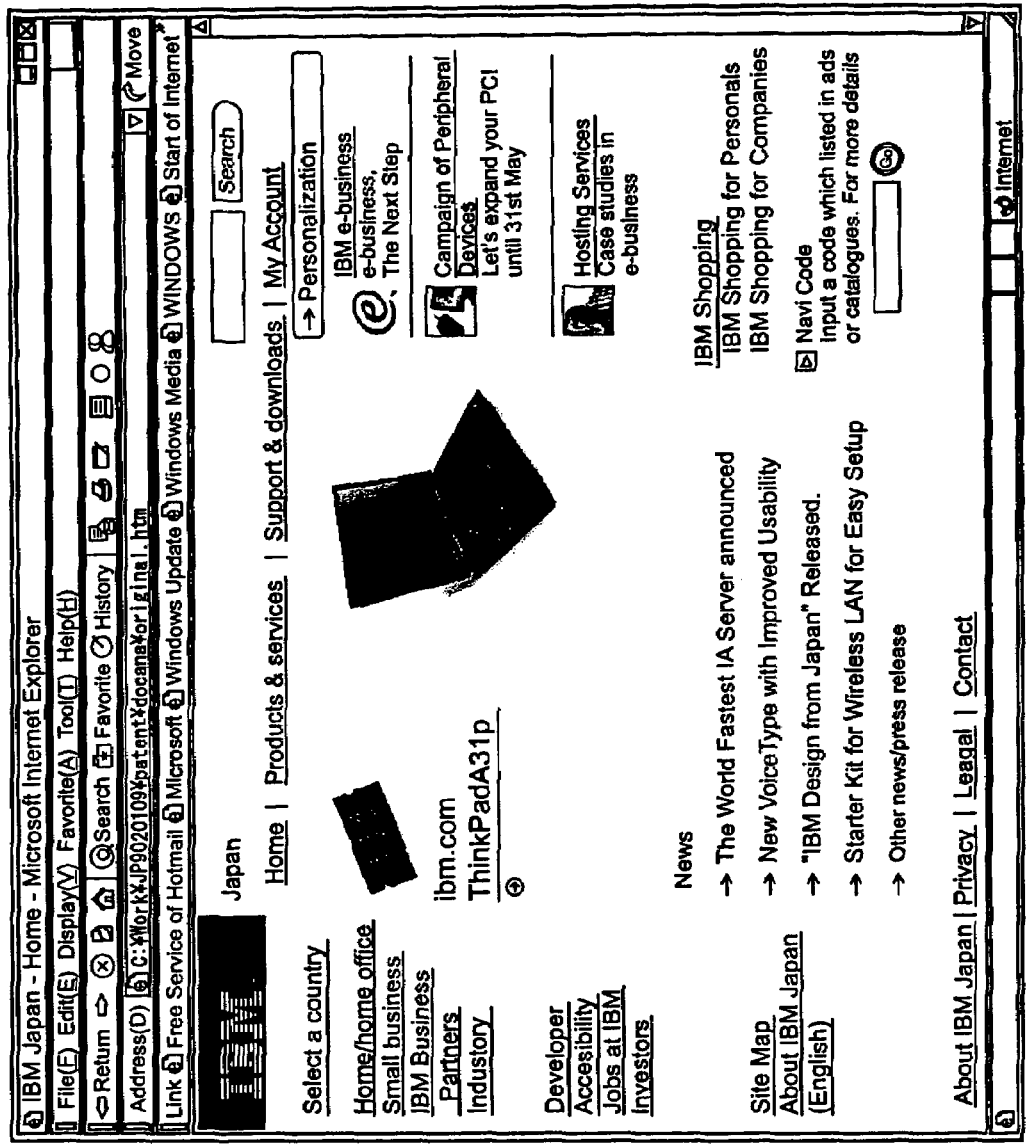
FIG. 13 is a diagram showing an example of a web page displayed by a browser.
Figure 14:
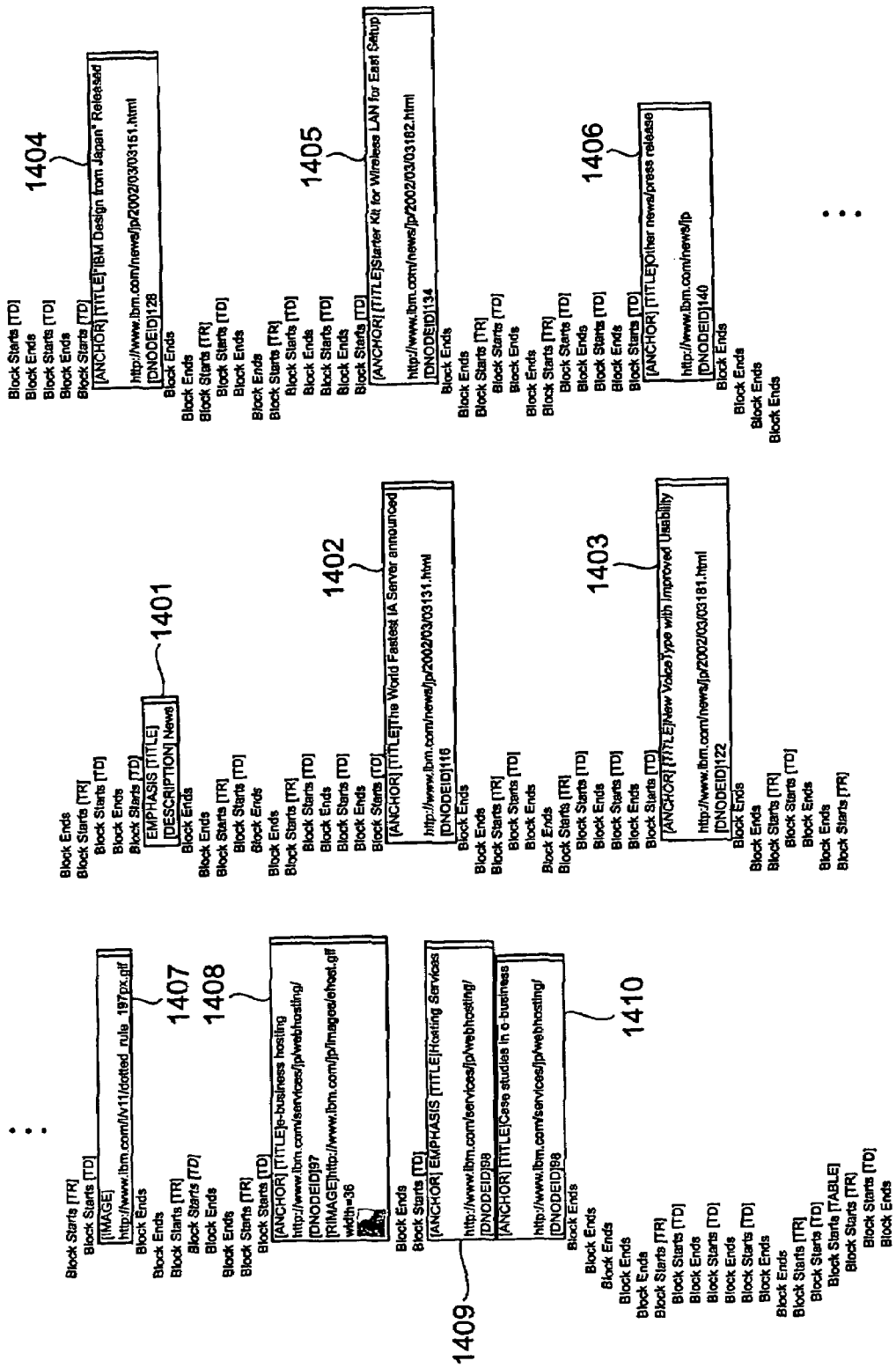
FIG. 14 is a diagram showing structural data in the state where an HTML document of the web page of FIG. 13 is subjected to a block analysis using tags.

FIGS. 13, 14 and 15 are diagrams showing the states where the document structure analysis is conducted for an HTML document of a specific web page. FIG. 13 shows the state where the web page is displayed, FIG. 14 shows structural data in the state where the block analysis using the tags at step S401 in FIG. 4 is implemented relative to the HTML document of the web page in FIG. 13, and FIG. 15 shows structural data in the state of blocks put in order through the analysis processing executed at step S402 and subsequent steps. FIGS. 14 and 15 each show only part of the result of the analysis of the HTML document.

Referring to FIG. 13, it is seen that the HTML document to be processed uses many table tags for proper layout. Therefore, although objects 1401 to 1406 appear to be well arranged on display, they may be distant from each other in terms of an internal structure. For example, "News" objects shown at a lower-middle part of a screen are well arranged on display as shown in FIG. 13. However, as shown in FIG. 14, the actual structure uses table tags for positioning the objects and thus includes many excessive tags in terms of the meaning. By conducting the document structure analysis of this embodiment, as shown in FIG. 15, those objects are analyzed as one element 1501, and "News" is assigned thereto as a title thereof.

An image object 1407 of dotted_rule_197px.gif in FIG. 14 is utilized as a delimiter. This is also correctly recognized and utilized as information serving as delimiter during the analysis, but not contained in a structure after the analysis shown in FIG. 15.

Those information elements specifying the same URL, such as objects 1408 to 1410 of e-business hosting (HYPERLINK "http://www.ibm.com/services/jp/webhosting/" http://www.ibm.com/services/jp/webhosting/), are grouped as one element 1502 through the document structure analysis of this embodiment as shown in FIG. 15.

As described above, as the result of the analysis conducted by the document structure analyzing section 12, a structure of an HTML document is grouped into blocks each unified in terms of the meaning. Accordingly, by moving to linking destinations of anchors based on this structure to crawl web sites, suitable crawling without visiting unrelevant web sites can be achieved.

As described above, according to the present invention, it is possible to enable a flexible information search based on a variety of strategies depending on a purpose of use of information.

Further, according to the present invention, it is possible to perform a search effectively utilizing information included in a web page, for realizing such an information search based on the variety of strategies in web site crawling.

The invention claimed is:

1. A method comprising:
   reading an HTML document of a web page as an analyzing object;
   conducting a temporary block analysis based on a description of HTML tags of the HTML document;
   using the HTML tags to temporarily divide the HTML document into blocks;
   identifying unnecessary information elements in the HTML document, wherein the unnecessary information elements include:
      plural information elements that include an OBJECT_IMAGE having a same Uniform Resource Locator (URL), wherein the OBJECT_IMAGE describes a type of media used to display the HTML document,
      a block of text in the HTML document that is shorter than a maximum predetermined length, and wherein the block of text appears in the HTML document more than a predetermined frequency,
      multiple anchors having a same title,
      image tags that only perform a role of punctuation for text in the HTML document, and
      multiple text blocks having a same description;
   defining any block in the HTML document that is deemed to be meaningless as an OBJECT_DELIMITER, wherein a block is deemed to be meaningless if that block contains only said unnecessary information elements and at least one anchor; and
   crawling only anchors found in blocks that have not been defined as OBJECT_DELIMITERs.

2. The method of claim 1, wherein the maximum predetermined length is 12 bytes.

3. The method of claim 2, wherein the predetermined frequency is ten times.

4. A computer-readable medium encoded with a computer program, wherein the computer program, when executed, performs the steps of:
   reading an HTML document of a web page as an analyzing object;
   conducting a temporary block analysis based on a description of HTML tags of the HTML document;
   using the HTML tags to temporarily divide the HTML document into blocks;
   identifying unnecessary information elements in the HTML document, wherein the unnecessary information elements include:
      plural information elements that include an OBJECT_IMAGE having a same Uniform Resource Locator (URL), wherein the OBJECT_IMAGE describes a type of media used to display the HTML document,
      a block of text in the HTML document that is shorter than a maximum predetermined length, and wherein the block of text appears in the HTML document more than a predetermined frequency,
      multiple anchors having a same title,
      image tags that perform a role of punctuation for text in the HTML document, and multiple text blocks having a same description;

defining any block in the HTML document that is deemed to be meaningless as an OBJECT_DELIMITER, wherein a block is deemed to be meaningless if that block contains only said unnecessary information elements; and crawling only anchors found in blocks that have not been defined as OBJECT_DELIMITERs.

5. The computer-readable medium of claim 4, wherein, the maximum predetermined length is 12 bytes.

6. The computer-readable medium of claim 4, wherein the predetermined frequency is ten times.

7. A method comprising:

dividing an HTML document into blocks;

identifying unnecessary information elements in the HTML document, wherein the unnecessary information elements include:

a block of text in the HTML document that is shorter than a maximum predetermined length, and wherein the block of text appears in the HTML document more than a predetermined frequency, multiple anchors having a same title, image tags that only perform a role of punctuation for text in the HTML document, and multiple text blocks having a same description;

defining any block in the HTML document that is deemed to be meaningless, wherein a block is deemed to be meaningless if that block contains only the unnecessary information elements and at least one anchor; and crawling only anchors found in blocks that have not been deemed meaningless due to containing only the unnecessary information elements.

* * * * *